(12) United States Patent
Bauernfeind

(10) Patent No.: US 8,171,209 B2
(45) Date of Patent: May 1, 2012

(54) WRITE PROTECTION METHOD AND DEVICE FOR AT LEAST ONE RANDOM ACCESS MEMORY DEVICE

(75) Inventor: Markus Bauernfeind, Alling (DE)

(73) Assignee: Fast LTA AG (DE)

( * ) Notice: Subject to any disclaimer, the term of this patent is extended or adjusted under 35 U.S.C. 154(b) by 328 days.

(21) Appl. No.: 12/513,285

(22) PCT Filed: Nov. 2, 2007

(86) PCT No.: PCT/EP2007/009527
§ 371 (c)(1), (2), (4) Date: May 13, 2009

(87) PCT Pub. No.: WO2008/052794
PCT Pub. Date: May 8, 2008

(65) Prior Publication Data
US 2010/0077138 A1   Mar. 25, 2010

(30) Foreign Application Priority Data
Nov. 2, 2006  (DE) .................. 10 2006 052 173

(51) Int. Cl.
*G06F 13/00*  (2006.01)
(52) U.S. Cl. ......... 711/104; 711/152; 711/163; 711/164
(58) Field of Classification Search .................. 711/104, 711/152, 163, 164
See application file for complete search history.

(56) References Cited

U.S. PATENT DOCUMENTS

| | | | | |
|---|---|---|---|---|
| 5,933,595 | A * | 8/1999 | Iizuka et al. | 711/164 |
| 6,240,531 | B1 * | 5/2001 | Spilo et al. | 711/163 |
| 6,598,135 | B1 * | 7/2003 | MacLeod | 711/163 |
| 6,611,904 | B1 * | 8/2003 | Uguen | 711/163 |

(Continued)

FOREIGN PATENT DOCUMENTS
DE   4208777 C1   5/1993

OTHER PUBLICATIONS

The International Search Report issued in connection with PCT/EP2007/009527 on May 2, 2008.

(Continued)

*Primary Examiner* — Trong Phan
(74) *Attorney, Agent, or Firm* — The H.T. Than Law Group

(57) ABSTRACT

In a write protection method for at least one random access memory device, the inherent problems of such memory devices with regard to data integrity and security with respect to hacker attacks, such that they can also be used for secure archiving in particular of a large volume of data, are avoided by virtue of the fact that commands directed to the at least one memory device are received by a write protection device connected upstream of the at least one memory device before said commands are forwarded to the at least one memory device, wherein commands received in the write protection device are compared with a positive list of permitted commands previously stored in the write protection device, wherein in one case, where the comparison determines that a permitted command is present, said command is forwarded to the at least one memory device, and in the other case, where the comparison determines that no permitted command is present, said command is not forwarded to the at least one memory device.

22 Claims, 3 Drawing Sheets

U.S. PATENT DOCUMENTS

| | | | |
|---|---|---|---|
| 6,959,373 B2 * | 10/2005 | Testardi | 711/163 |
| 7,162,602 B2 * | 1/2007 | Kodama | 711/163 |
| 7,228,569 B2 * | 6/2007 | Barrenscheen | 711/163 |
| 7,558,930 B2 * | 7/2009 | Kitamura et al. | 711/163 |
| 7,592,829 B2 * | 9/2009 | Walmsley et al. | 711/164 |
| 7,685,390 B2 * | 3/2010 | Fujita et al. | 711/163 |
| 7,739,472 B2 * | 6/2010 | Guterman et al. | 711/104 |
| 7,809,911 B2 * | 10/2010 | Gentry et al. | 711/163 |
| 7,831,790 B2 * | 11/2010 | Lambert et al. | 711/163 |
| 2005/0231846 A1 | 10/2005 | Winarski | |
| 2005/0235095 A1 | 10/2005 | Winarski | |
| 2006/0002246 A1 | 1/2006 | Emberty | |
| 2006/0036804 A1 | 2/2006 | Shiota et al. | |

OTHER PUBLICATIONS

International Preliminary Report on Patentability, issued in connection with corresponding international application No. PCT/EP2007/009527 on May 14, 2009.

* cited by examiner

WRITE PROTECTION METHOD AND DEVICE FOR AT LEAST ONE RANDOM ACCESS MEMORY DEVICE

The present invention generally relates to the storage and archiving of data. To be more precise, the present invention relates to a write protection method for at least one random access memory device, such as one or more hard disks, and to an appropriate write protection apparatus for carrying out the method.

For the purpose of permanently storing or archiving a large volume of data, magnetic tapes are conventionally used, there being various tape technologies from different manufacturers which are not compatible with one another. The archiving of data using magnetic tapes is relatively secure per se but costly, and the data can be accessed only relatively slowly.

In addition, the prior art discloses random access memories, such as hard disks and flash memory devices. Nowadays, hard disks are relatively inexpensive, since they are mass-produced for personal computers. However, they have a relatively high failure rate, which is why inexpensive hard disks of this kind are not adequate for the mainframe area and for important server applications. To avoid the problem of high failure probability with relatively cheap hard disks, there are various approaches. The most important solution involves combining several inexpensive disks and connecting them up to form a logical hard disk. On account of the redundancy principle, the probability of all hard disks failing is not especially high, and the costs of such a system are much cheaper than in the case of specially produced high-quality hard disks or tape storage systems. Such systems are known by the name RAID (Redundant Array of Inexpensive Disks or Redundant Array of Independent Disks), for example. In this case, a plurality of independent hard disks are interconnected to form a large logical drive, with not only data being stored on this arrangement or this array but also redundancy information being added. This redundancy information may be the data themselves (mirroring) or may comprise parity data which are calculated from a plurality of data blocks. A computer's operating system then no longer accesses the individual physical hard disks but rather the virtual array instead. The aim of RAID is to increase the availability of all the data, since downtimes are prevented in the event of hard disk failure. However, a RAID system of this kind does not allow data to be restored which have been erased by the users or have been destroyed by an event, such as theft, fire, water damage or a hacker attack, etc.

The basic design and the manner of operation of a hard disk are well known in the prior art. For the purpose of data storage, one or more magnetic disks are provided. Known hard disks incorporate three or more such disks, for example. For reading and writing from and to the magnetic disks, a read/write head is provided. A respective read/write head is arranged on the top and bottom of a magnetic disk. Each magnetic disk therefore has two read/write heads. The individual read/write heads form a comb which can move to and fro from the inside to the outside of the magnetic disks just as a whole unit in order to be able to read and write to the individual tracks. A hard disk basically has two motors, namely firstly the drive motor for the magnetic disks so that they can rotate and secondly a linear motor for the read/write head. In addition, a hard disk has integrated control electronics and an interface. The most important hard disk interfaces are IDE, EIDE, SCSI, ATA and S-ATA, with the IDE interface corresponding to the P-ATA interface. To understand one possible principle of data management on a hard disk, it is necessary to examine the logical classification of a magnetic disk, that is to say of the actual data storage medium. In this connection, reference is also made to FIG. 1. The magnetic disk comprises a large number of individual tracks which are arranged concentrically. In this context, concentrically means that there is not a single track which starts at the outer edge and moves to the center in the manner of a spiral (as in the case of a record, for example), but rather that the tracks are arranged in circles next to one another. The smallest possible storage unit is a prescribed number of information items, e.g. 512 bytes. Each track is now classified into precisely these variables, which form the sectors. A sector is therefore a storage area with a size of 512 bytes, for example, on a track. Each sector has control information (e.g. checksums) which is used to ensure that information has been written or read correctly. The schematic illustration in FIG. 1 reveals that, although the sector surface area increases from the inside to the outside, this relates not to the file size but rather merely to the surface area. Although this has the drawback of the storage density decreasing towards the outside, it is advantageous because the read/write head requires the same time for reading and writing each track. The sum of all identical tracks on individual magnetic disks is called a cylinder. The capacity of a hard disk is obtained from the number of sectors multiplied by the number of read/write heads multiplied by the number of cylinders. A cluster is understood to mean an amalgamation of sectors for the data management on hard disks. A cluster is therefore a group comprising a plurality of sectors, as shown in FIG. 1 with an example of an eight sector cluster. When a hard disk is partitioned and formatted, all the sectors are combined into clusters. For a computer, the smallest logical unit is then the size of the cluster. This means that the smallest possible storage location has the size of a cluster as a minimum. If the cluster is chosen to be too small, so many small fragments are obtained, which impairs performance; if the clusters are chosen to be too large, too much storage space is wasted for small files. The file system stipulates what size the clusters possess. Furthermore, it ensures that data can be stored on the disk in the form of files. In addition, it contains a kind of list of contents (File Allocation Table) so that the files can be found again and can be stored with a hierarchical organization.

However, modern hard disks may also have only one magnetic disk and two read/write heads. In addition, modern hard disks have what is known as an "LBA" (logical block addressing) mode. In this case, when the hard disk is addressed, only an address for a virtual or logical block is used, with the physical location(s) (track(s) and sector(s)) which correspond(s) to a block being determined by the hard disk itself. For applications, only a linear storage structure in the form of logical blocks therefore becomes visible. The blocks are numbered continuously by means of natural numbers and can be addressed using the block number. In this case, the standard size of the blocks may be 512 bytes or a multiple thereof, for example. Block memory devices of this kind, such as hard disks with LBA addressing, are particularly suitable for use with the present invention, since they can be addressed with corresponding simplicity.

Finally, the prior art for computer storage media also discloses the concept of WORM (Write Once, Read Many) storage technology, which allows writing to a storage medium or drive once and subsequently prevents the data from being erased again. Such drives are intentionally non-overwritable, since the intention in this application is to store data which cannot be erased by chance or intentionally by users or by third parties. WORM memory devices of this kind are used for the archiving purposes of organizations, such as authorities or large companies. A quite simple example of WORM memory device of this kind is a CD-ROM to which it is possible to write once only.

In view of the prior art outlined above, there is a need to render inexpensive random access memory devices, particularly hard disks, easy to manage for permanent archiving within the context of a WORM approach, in order to store the data inexpensively and permanently, with maximum security from accidental changes, software errors or natural catastrophes, such as water, fire, etc., but also from hacker attacks being ensured.

The invention is therefore based on the object of avoiding the drawbacks of the prior art, and particularly of developing a method of the type cited at the outset such that the inherent problems of random access memories regarding data integrity e.g. on account of software errors, and security from hacker attacks are avoided, which means that said memories can also be used for securely archiving particularly a large volume of data.

This object is achieved for a method of the type cited at the outset by virtue of a write protection device connected upstream of the at least one memory device receiving commands sent to the at least one memory device before said commands are forwarded to the at least one memory device, wherein commands received in the write protection device are compared with a positive list of permitted commands previously stored in the write protection device, wherein in a situation in which the comparison determines that a permitted command is present, this command is forwarded to the at least one memory device, and wherein in the other situation, in which the comparison determines that a permitted command is not present, this command is not forwarded to the at least one memory device. In this context, the expression "command" denotes both command type or command within the meaning of an abstract command in a command set and a specific command with certain parameters. Thus, certain command categories may be contained in the positive list, but also command categories just with certain parameters/arguments. The use of previously stored permitted commands allows certain categories of commands to be rejected or blocked generally by the forwarding or passage through to the memory device (with or without error reporting). Equally, however, it is also conceivable for there to be certain categories of commands e.g. write commands, for which the permissibility is dependent on the parameters or arguments thereof. The comparison with the previously stored permitted commands may thus be a simple comparison of the presence of a command in a "positive list"; equally, however, a further refinement of the comparison is covered by the invention, in which more complex comparisons are performed which entail closer examination/comparison of the parameters of the command.

In an alternative refinement of the invention, in the other situation, in which the comparison determines that a permitted command is not present, this command is changed in the write protection device before the command is forwarded to the at least one memory device. By way of example, the command can be changed by converting the command such that it corresponds to a command which corresponds to the positive list of commands which has previously been stored in the write protection apparatus. In this manner, a command which is not uncritical per se is not necessarily lost. In addition, to this end it is preferred for the command to be changed such that it is contained positive list previously stored in the write protection device.

Advantageously, in the situation in which the comparison determines that a permitted command is present, a test is performed to determine whether the command is a write command. This test is particularly advantageous, since write commands, when relating to a storage area which has already been written to, are by their nature overwrite commands and hence erasure commands. The test for a write command makes sense against the background that commands of this kind absolutely need to be contained in the positive list, since they must nevertheless be regarded generally as critical. In principle, a WORM strategy is generally not particularly suitable for using the allocation mechanisms for regular file systems which are based on the possibility of overwriting information on the basis of random access.

In line with one preferred embodiment of the present invention, it is preferred that a write protection device connected upstream of the at least one memory device receives commands sent to the at least one memory device before said commands are forwarded to the at least one memory device, wherein the at least one memory device has a multiplicity of continuously numbered blocks, wherein the command is a write command which has a number for a starting block for the write command and a number of describing blocks to be written to, or wherein the write protection apparatus has a counter device whose current counter reading minus one represents a write-protected area of the at least one memory device, wherein the current counter reading is compared with the number of the starting block, wherein in the situation in which the current counter reading is higher than the number of the starting block, the command is not forwarded to the at least one memory device, with the current counter reading remaining unchanged. Hence, a linear virtual volume writing strategy is implemented, in the manner of writing to a tape storage medium, which particularly also reduces the efforts for tracking areas on the memory device which have already been written to. This exemplary embodiment is particularly advantageous in connection with hard disks which have an LBA mode. In principle, it should also be pointed out that the invention is suitable both for storage with increasing addressing, explained above, and for storage with decreasing addressing. In the latter case, writing to the memory device accordingly takes place from top to bottom (in terms of the block numbers), where a respective area having the highest block numbers is write-protected, and said area grows downwards (in terms of block numbers) as storage progresses.

It is also preferred in this context that in the situation in which the current counter reading is the same as the number of the starting block, the command is forwarded to the at least one memory device, with the current counter reading being increased by the number of blocks to be written to. This ensures that the current counter reading continues to represent the area of the memory device that is to be protected after the write command has been executed too.

It is also preferred in this context that in the situation in which the current counter reading is lower than the number of the starting block, the command is not forwarded to the at least one memory device, with the current counter reading remaining unchanged. This ensures that an area of the memory device which has already been written to is not overwritten.

As an alternative, it is also in accordance with the present invention that in the situation in which the current counter reading is lower than the number of the starting block, the command is forwarded to the at least one memory device, with the current counter reading remaining unchanged. On the basis of this alternative variant of the invention, although the write command is executed, i.e. it is entirely possible to execute a write command in an unprotected area of the storage apparatus, information written in this manner is not protected. The current counter reading therefore reflects the write-protected area of the memory device after the memory device is filled from the bottom starting at block no. 1.

Advantageously, the counter reading is a natural number between zero or one and the number of blocks in the at least one memory device. It is also preferred that the current counter reading minus one corresponds to the number of the last or most recent block written to in the at least one memory device. If the blocks in the memory device are written to linearly from bottom to top (with or without gaps) in relation to block numbering, the number of the most recent block written to is the same as the highest number of the blocks written to.

Preferably, the write protection apparatus is a physical unit which has a processing device, which has the counter device, and a memory. The write protection apparatus can therefore be plugged into a cable connection or directly onto the memory apparatus, for example as an intermediate plug or dongle.

In one practical variant of the implementation of the present invention, it is preferred that the memory has a nonvolatile memory for the current counter reading. This means that the security of the system is assured even in the event of a power failure and the like. Alternatively, the memory for the current counter reading may also be in volatile form, in which case the current counter reading is read at intervals from the volatile memory and is stored on a nonvolatile memory, with the counter reading most recently stored in the nonvolatile memory being used as a fallback in the event of a power failure and the like. The latter storage scheme can also be referred to as a "lazy write" storage scheme.

Advantageously, the commands are transferred from a host computer to the at least one memory device, the write protection apparatus being arranged in the data transfer path between the host computer and the at least one memory device, wherein the commands are transferred from the host computer to the write protection apparatus in the form of Ethernet data packets, and the commands for the at least one memory device being generated in the write protection apparatus from the received and translated Ethernet data packets. This embodiment is preferred because the Ethernet data packets need to be translated in regular hard disk control commands anyway, and in this respect the checks provided on the basis of the present invention can naturally be performed before the conversion.

In addition, it is preferred, in line with the present invention, that the positive list for permitted commands is checked following the translation of the Ethernet data packets, and only in a situation in which a permitted command is present is an appropriate command generated for forwarding to the at least one memory device. In this way, effort is saved because inadmissible commands, i.e. commands not contained in the positive list, do not actually need to be encoded on the basis of the interface specification of the memory apparatus in the first place.

Advantageously, the command set of the commands which are produced by the host computer and which are encoded in Ethernet data packets is different than the standard command set for the at least one memory device. In this way, the entire procedure can be optimized, since the commands sent by the computer do not reach the memory apparatus directly anyway, which is why it is possible to use a command set which is particularly optimized for the present invention. By way of example, this may involve the parameters of the write command X and N (cf. FIG. 3 and the associated description) already having been defined on the basis of the conventions in accordance with the present invention and not needing to orient themselves to the interface specification or manufacturer-specific requirements. In this variant, a connection option for the write protection apparatus which is particularly easy to handle in practice is obtained.

In one particularly practical embodiment of the invention, it is preferred that the write protection apparatus is in the form of an intermediate plug between a cable connection from the host computer and the at least one memory device.

One particularly simple implementation of the invention is obtained by virtue of the at least one memory device being a hard disk or an arrangement of hard disks, wherein the write command has a number of successive write instructions in various registers on a hard disk, wherein the write instructions are stored in storage areas of a memory in the write protection device which are modeled on the registers of the hard disk before the write command is forwarded to the at least one hard disk, and wherein only after an admissibility check on the write command is said write command forwarded to the at least one memory device. In the write protection apparatus, shadow registers are modeled on those of the memory apparatus, and only when it is possible to be certain that a command is uncritical are these commands transferred to the memory device. This variant of the invention is particularly preferred when an Ethernet is not being used, and is particularly used to prevent data-destroying timing infringements.

It is also preferred that the admissibility check on the write command involves comparison with commands previously stored in a positive list and/or comparison with a current counter reading.

Further preferred embodiments of the invention are disclosed in the dependent patent claims.

The invention, and further features, aims, advantages and application opportunities thereof, is/are explained in more detail below using a description of the preferred exemplary embodiments with reference to the appended drawings. In the drawings, the same reference symbols denote the same or corresponding elements. In this case, all the features described and/or shown in the figures form the subject matter of the present invention on their own or in any meaningful combination, specifically regardless of their summarization in the patent claims or the referencing therein. In the drawings:

Figure 1:
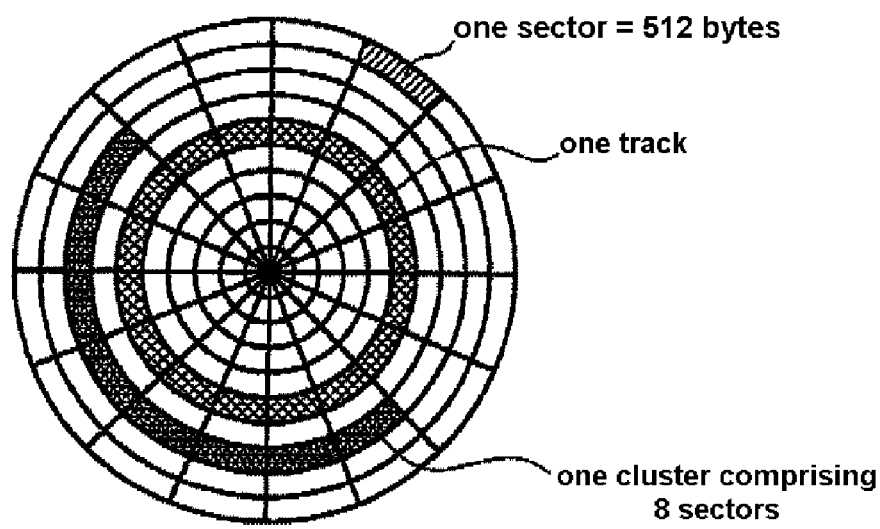
FIG. 1 shows a schematic illustration to explain the fundamental design of a hard disk based on the prior art.
Figure 2:
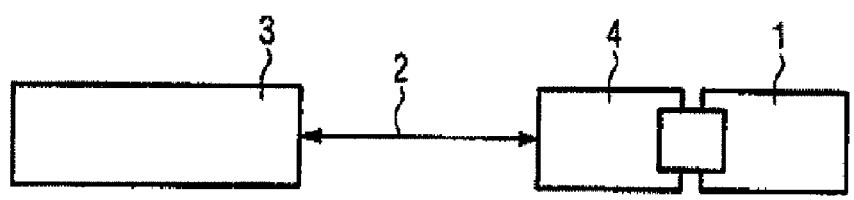
FIG. 2 shows a schematic illustration of the intermediate circuit of a write protection apparatus based on an exemplary embodiment of the present invention.

FIG. 2 shows a schematic block diagram of a random access memory device 1 which, in one preferred embodiment of the invention, is a hard disk or an array of hard disks which can form a standard logical hard disk drive. The memory device 1 is connected by means of a regular data link 2 to a host system 3, e.g. a personal computer. By way of example, the data link 2 may be an IDE or S-ATA data link by means of cable or an ATA network link by means of an Ethernet, which will be explained in more detail below. The invention involves the memory device being preceded by a write protection apparatus 4 in the direction of data or commands arriving from the host system 3. The write protection apparatus 4 may be connected to the memory device 1 by means of cable or can be plugged directly into a hard disk drive interface. The write-protection apparatus 4 is a dedicated piece of hardware of low complexity which, as a result of its design, acts as a single critical point for rejection on the basis of potential harmful commands. The write protection apparatus 4 is a separately manageable physical unit, for example implemented as an electronic circuit board, which has been inserted into the data link between the host system 3 and the hard disk drive 1. Contrary to the illustration in FIG. 1, a write protection apparatus 4 can also control more than one hard disk and perform isolated tasks in parallel. In addition, a housing may contain a plurality of write protection apparatuses or controllers which respectively actuate one or more hard disks. The write protection apparatus 4 avoids problems which are connected to other implementations, such as to a WORM extension of the firmware in the memory device 1 or a software-based write protection scheme on a correspondingly complex HOST system 3. Unlike in approaches of this kind, the write protection apparatus 4 according to the invention cannot be modified or bypassed—plain and simple—since it does not provide the interface which is required for such actions. The task of the write protection apparatus 4 is to prevent the passage or forwarding of commands which are potentially harmful for the memory device 1 to the memory device 1, least in unaltered form.

Figure 3:
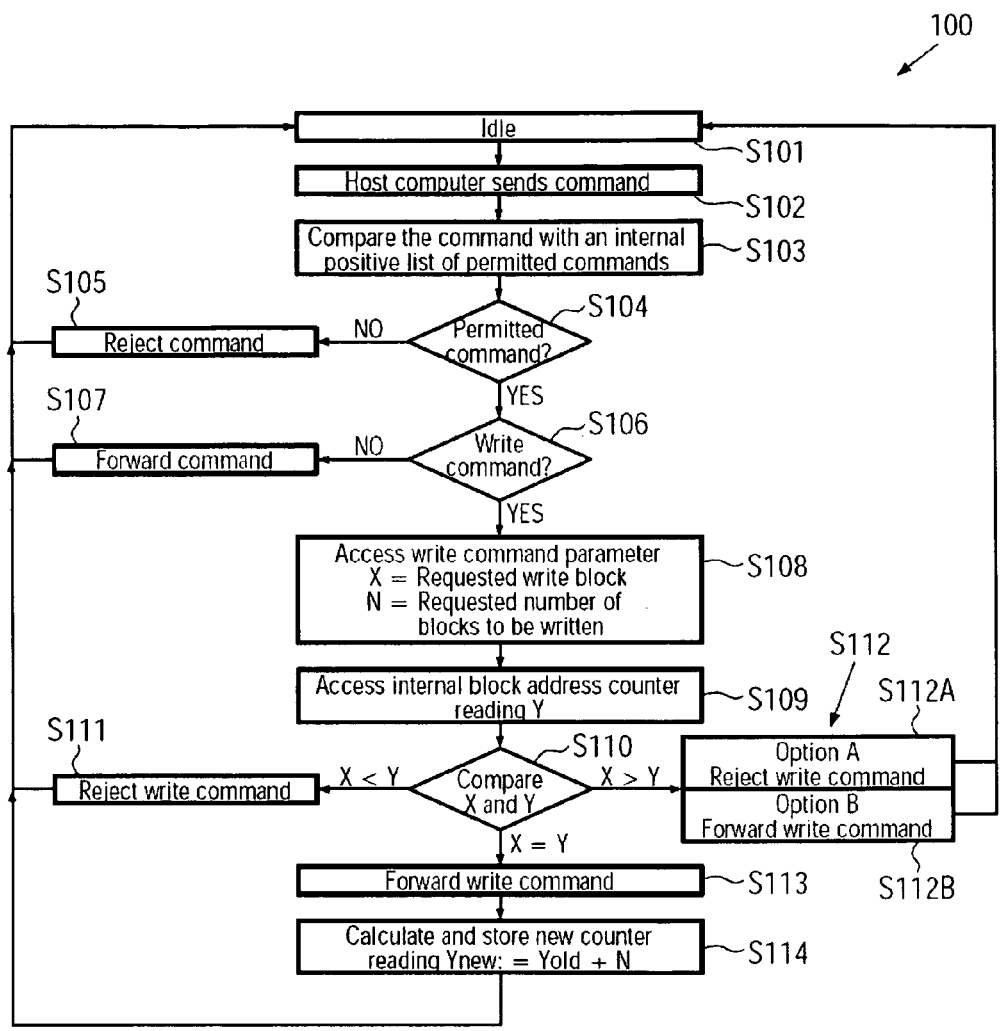
FIG. 3 shows a simplified flowchart to explain method steps in the write protection method based on an exemplary embodiment of the present invention.

With reference to the schematic flowchart in FIG. 3, the text below provides a more detailed explanation of the individual steps of an exemplary embodiment for the inventive write protection method implemented by the write protection apparatus 4. In this case, the flowchart is provided generally with the reference symbol 100. In step S101, the write protection apparatus 4 is in an idle mode and waits for incoming commands. In step S102, the host system 3 uses the data link 2 to transfer a command directed at the memory device 1, said command being intercepted, so to speak, by the write protection apparatus 4. A memory in the write protection apparatus 4 stores an internal positive list of permitted or legal commands. In a step S103, the command transferred in step S102 is now compared with the positive list. If the result of the test (cf. step S104) is NO, the write command is rejected, i.e. it is not forwarded to the memory device 1, and the system returns to the idle mode of step S101. Alternatively, the command could also be modified such that it passes the check in steps S103 and S104. The background to this check, that only commands which are defined in a positive list are forwarded to the memory device 1, is to prevent damage to data stored in the memory device 1. For this reason, all other commands which may be potentially harmful to data integrity are rejected or changed. In this regard, it should be noted that besides read and write commands there are also a number of further commands, e.g. system commands, reference being made in this connection particularly to the ATA interface specification, some of said system commands being able to be used to attack data integrity. This is the background for the positive list proposed by the present invention, which forwards only "known good" commands. If the result of the test in step S104 is YES, a test is performed in a step S106 to determine whether the command received in step S102 is a write command. If the result of the test in step S106 is NO, the command is forwarded to the memory device 1 in step S107 and the system returns to the idle mode of step S101. If the result of the test in step S106 is YES, further tests for potential hazards of the write command are performed in the subsequent method steps. This is because random write commands, specifically both intentional and accidental, infringe the proposed WORM concept and can then destroy integrity. In line with one exemplary embodiment of the present invention, only write commands which follow the proposed linear write concept to the letter will be admitted and pass through the write protection apparatus 4 to the memory device 1 unchanged. All other write commands are rejected. To be more precise, if it has been found in step S106 that the command is a write command, two pieces of information or parameters in the write command are extracted therefrom in step S108. To be more precise, these parameters are the variable X, i.e. the number of the requested starting block, and N, the requested number of blocks to be written to. It should be noted that the expression "block" as used in connection with the present invention can entirely comprise one or more blocks on a hard disk. The block in turn may be any variable from one byte upwards, preferably 512 bytes. The appropriate more comprehensive definition of a "block" allows cohesive data which are larger than a conventionally defined block to be handled in a simple manner. To evaluate the parameters X and N obtained in step S108, the counter reading Y on a counter device implemented in software and/or hardware in the write protection apparatus 4 is requested in step S109. Although not explicitly mentioned in the flowchart 100 in FIG. 3, the counter reading provides a piece of information about which portion of the memory device 1 has already been written to and can therefore no longer be changed. The parameters X, N and Y are natural numbers and are upwardly limited by the size of the memory device 1, expressed in terms of its number of blocks. In the exemplary embodiment shown, the counter reading Y on the block address counter implemented in the write protection apparatus 4 is one greater than the highest number of the block which has already been written to, whose content is intended to be protected. In step S110, the parameters X and Y are compared with one another. The result of the comparison in step S110 is taken as a basis for handling the write command in further method steps. If the result of the comparison is that X is less than Y, the write command is rejected in a method step S111, and also in step S105, and the method returns to the idle state (S101). Expressed clearly, the comparison result that X is less than Y means that the write command relates to an area which has already been written to and therefore needs to be write protected, which is why it cannot be executed. If the result of the comparison is that X is greater than Y, there are two options, in principle, which are indicated in step S112. In line with the variant of the invention which is indicated in S112A, the write command is rejected and the method returns to the idle state of step S101. The procedure in this variant based on step S112A is therefore in line with step S111 for the situation in which X is less than Y.

Overall, this variant of the invention is therefore that if X is not equal to Y then the write command is rejected. Alternatively, however, there is also a further conceivable variant of the invention as indicated in step S112B. In this variant, the write command is forwarded to the memory device 1 unchanged, whereupon the system returns to the idle state of step S101. Quite generally, it should be noted that a situation in which X is greater than Y the write command is such that the write command relates to data being written in an area of the memory device which is not intended to be write protected, since the start of the write instruction is greater than the lowest-addressed protected storage area defined by the counter reading Y. If it were desirable to admit such commands which do not change write-protected data, the procedure should be in line with step 112B. If stringent linear full writing to the memory device 1 is desired, in which no gaps are produced, the procedure should be in line with the variant indicated by step S112A. It should be noted that both in the variant in line with step S112A and in step S112B, there is no further change to the counter reading Y. This means that the data written to the memory device 1 for a write command (S112B) of this kind are not write protected. However, in this case too, the counter reading Y could be increased to the value of X+N, with the result that data written to the memory device 1 are also protected in the case of X being greater than Y; in this case, however, the drawback that the memory device 1 is not utilized fully on account of gaps is accepted. In a case in which the result of the comparison in step S110 is that X is equal to Y, the method continues to transfer or forward the write command to the memory device 1 unchanged in step S113. Subsequently, in a step S114, the internal address block counter Y is set to a new value, namely the old value increased by N, or Ynew=Yold+N, so as to protect the data rewritten on the basis of the write command, which means that for these data the memory device 1 is a read-only device on the basis of its storage area addresses. In step S114, the method returns to the idle mode of step S101.

Now that the fundamental arrangement of the inventive write protection apparatus 4 and the fundamental method cycle of an exemplary embodiment of the inventive method implemented in the write protection apparatus 4 have been described above in conjunction with FIGS. 2 and 3, different variant embodiments of the invention will be explained below in more detail. In all of the variant embodiments of the invention which follow, it is assumed that they use memory devices 1 which are based on ATA or S-ATA interfaces, which is preferred for reasons of cost and storage capacity. It goes without saying that the present invention can also be used with all other existing and future memory interfaces, such as SCSI, Firewire, etc. and storage media, however.

Variant 1: ATA via Ethernet

The known ATA via Ethernet technology is used to provide a means for connecting an almost unlimited number of hard disks to a host control apparatus using standard Ethernet wiring and switches. ATA commands produced by the host system 3 are converted or packaged into Ethernet packets and are transferred to the inventive write protection apparatus 4 by means of network wiring, said write protection apparatus being connected to the memory device 1 by means of an ATA or S-ATA cable. In this variant, the write protection apparatus 4 operates not only as described above but also performs the functions of an ATA via Ethernet control apparatus, i.e. it receives the relevant Ethernet packets and translates the packaged commands into regular ATA commands, which are then either rejected or forwarded to the memory apparatus 1. This variant of the invention is particularly advantageous, since the ATA via Ethernet control apparatus software has only very little complexity, which is preferred because it may be advantageous if the write protection apparatus 4 does not require a dedicated operating system. However, it goes without saying that it is also possible to use a conventional operating system, e.g. Linux. The first case mentioned, i.e. the write protection apparatus 4, is without a dedicated operating system, and is therefore particularly advantageous, since it allows not only the system complexity and costs to be reduced but also allows the opportunities for attacking the system to be kept at a minimum. The fact that the write protection apparatus in the form of an ATA via Ethernet control apparatus translates the Ethernet packets locally and produces ATA commands locally completely prevents opportunities for attack which attempt to utilize timing and time control infringement of the ATA communication. The absence of higher-layer network protocol layers, e.g. ftp, telnet or even TCP, prevents attacks at this level. The rejection or declining of potentially harmful ATA commands is effected easily by virtue of these commands not being encoded in the ATA via Ethernet control apparatus portion of the write protection apparatus 4. What is obtained is therefore an extremely secure design.

Variant 1A: Modified ATA via Ethernet

In line with this modification relating to variant 1 of the present invention described above, the write protection apparatus 4, which is likewise in the form of an ATA via Ethernet control apparatus here, receives a modified set of commands instead of direct ATA commands via the Ethernet. The command set is determined such that it meets the requirements of secure WORM storage exactly. This comprises the modification of existing commands and of new WORM specific commands. In this case, only the software interface relating to the host system 3 is thus altered and the WORM concept is implemented as described above.

Variant 2: Intermediate Plug in Hard Disk Cable

In this approach, the write protection apparatus 4 is simply inserted into the ATA/S-ATA cable. In this case, the potentially nonsecure host system 3 and not the write protection apparatus 4 itself will produce the ATA command. An IDE/S-ATA command comprises a number of successive write operations to a few I/O registers which are defined in the ATA specification. The registers follow a strict convention and are called Feature Register, Sector Count Register, LBA low/mid/high Register, the Device Register and Command Register. Before the actual command request (by writing the command code to the Command Register) can be transferred to the memory device drive 1, all other registers must be filled with associated values, such as the requested LBA address for a read or write command. Said command potentially allows hacker attacks on the basis of ATA timing infringements. In line with the variant of the present invention which is proposed here, shadow or virtual ATA registers are provided in the write protection apparatus 4. ATA register commands which are sent by the host system 3 are put into the shadow registers of the write protection apparatus 4. In this case, provision is made for the register commands not yet to be transferred to the memory device at this time. Any infringement of timing or time control or of other rules will merely corrupt values which are stored in the shadow registers. As soon as the write protection apparatus 4 has received a new value for the shadow command register, the command request is checked. If it is validated, the write protection apparatus 4 produces a sequence of register commands for the memory device 1, with all shadow register values being transferred to the memory device 1. As a result, a command is transferred to the memory apparatus 1, with attacks being almost precluded.

Variant 3: Combination of ATA via Ethernet and Intermediate Plug

For a maximum security level, a combination of variants 1 or 1A and 2, which are described above, is possible. In this variant, the write protection apparatus 4 is simply inserted into an ATA cable, this being connected to the memory apparatus 1 by an ATA via Ethernet control apparatus. A design of this variant of the invention puts up two independent barriers against accidental or intended illegal write access operations, which maximizes system security.

Figure 4:
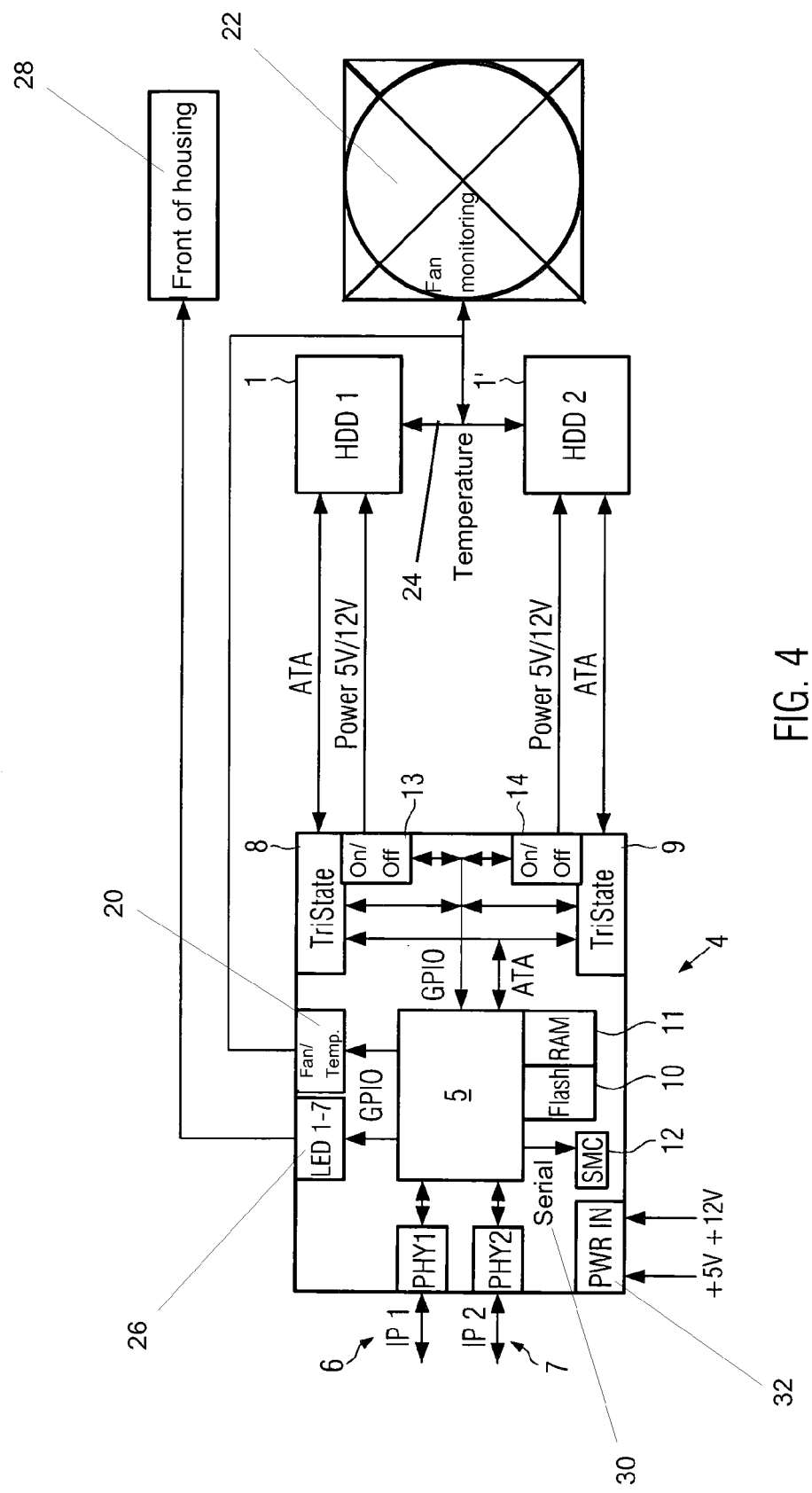
FIG. 4 shows a schematic block diagram to explain the design of the write protection apparatus based on an exemplary embodiment of the present invention.

The schematic block diagram in FIG. 4 reveals the hardware design of the write protection apparatus 4, which with two memory apparatuses 1 and 1', which are both in the form of a hard disk drive HDD1 and HDD2. The hardware design shown in FIG. 4 follows variant 1 described above. An individual host personal computer can be used to control an almost unlimited number of hard disks by means of Ethernet wiring. A very inexpensive configuration is therefore possible. There is no opportunity for security attacks on the basis of timing, since the write protection apparatus 4 produces its own ATA commands and timing. Additional local management functions can be performed by the write protection apparatus 4, such as an independent sweep of the local hard disk, without producing network traffic. In line with the present invention, write commands and other potentially harmful commands are therefore "intercepted", so to speak, by the write protection device, and only positively known benign commands afforded to the memory device. In this case, the memory device may be a hard disk, a number of hard disks or an array of hard disks. This allows only those commands for which it is possible to be certain that no data corruption is possible to be forwarded to the memory device. FIG. 4 also reveals that the write protection apparatus 4 has a processor or control device 5, e.g. the Etrax FS processor from the Swedish company Axis, which is connected to the host system 3, shown schematically in FIG. 2, by means of one or more network interface(s) 6, 7 shown as IP1 and IP2 in FIG. 4, provided for reasons of redundancy, via Ethernet. Two TriState switches 8, 9 in the write protection apparatus 4 are provided in the ATA connection to each of the hard disks or hard disk drives (HDD) 1 and 1' in order to isolate the data link (prevent what is known as "latch-up"). As can be seen in FIG. 4, the processor is connected to various further components, such as the fan controller and temperature sensors 20 for the memory devices 1 and 1' to monitor a fan shown at reference number 22 and to measure temperature at reference number 24, and display LEDs 26 which are positioned on a front 28 of a housing of write protection apparatus 4, by means of appropriate interfaces (GPIO=general purpose input output). The processor 5 also has appropriate flash memories 10 and RAM stores 11 for storing data, such as the current counter reading. Hence, processor 5 and memories 10 and/or 11 form the counter device. A serial interface 30 connects the processor 5 to a component 12, such as security mediated certificateless (SMC) cryptography in order to produce keys for using cryptographic methods. Write protection apparatus 4 can be powered by either a 5V or 12V electrical source shown at 32, and the power is transferred to memory apparatuses 1 and 1' through ON/OFF switches 13 and 14, respectively. Additionally, network interfaces IP1 and IP2 shown at 6 and 7 are connected to processor 5 through physical layers, shown as PHY1 and PHY2 respectively.

The invention has been explained in more detail above with reference to preferred embodiments thereof. However, it is obvious to a person skilled in the art that different variations and modifications can be made without departing from the concept on which the invention is based.

The invention claimed is:

1. A write protection method for at least one random access memory device, characterized in that a write protection device connected upstream of the at least one memory device receives a command sent to the at least one memory device before said command is forwarded to the at least one memory device, wherein said command is received in the write protection device is compared with a positive list of permitted commands previously stored in the write protection device, wherein in a first situation in which said command is present on said positive list, said command is forwarded to the at least one memory device, and wherein in a second situation, in which said command is not present on said positive list, said command is not forwarded to the at least one memory device.

2. The write protection method as claimed in claim 1, characterized in that in the second situation, said command is changed in the write protection device before said command is forwarded to the at least one memory device.

3. The write protection method as claimed in claim 2, characterized in that said command is changed to another command that is present on said positive list.

4. The write protection method as claimed in claim 1, characterized in that in the first situation, a test is performed to determine whether said command is a write command.

5. The write protection method as claimed in claim 4, wherein the at least one memory device has a multiplicity of continuously numbered blocks, wherein said command is the write command which has a first number for a starting block for the write command and a second number of blocks which shall be written to, wherein the write protection device has a counter device whose current counter reading minus one (−1) represents a write-protected area of the at least one memory device, wherein the current counter reading is compared with the first number of the starting block, and wherein if the current counter reading is higher than the first number of the starting block, said command is not forwarded to the at least one memory device, with the current counter reading remaining unchanged.

6. The write protection method as claimed in claim 4, characterized in that if the current counter reading is the same as the number of the starting block, said command is forwarded to the at least one memory device, with the current counter reading being increased by the number of blocks to be written to.

7. The write protection method as claimed in claim 4, characterized in that if the current counter reading is lower than the number of the starting block, said command is not forwarded to the at least one memory device, with the current counter reading remaining unchanged.

8. The write protection method as claimed in claim 4, characterized in that if the current counter reading is lower than the number of the starting block, said command is forwarded to the at least one memory device, with the current counter reading remaining unchanged.

9. The write protection method as claimed in claim 4, characterized in that the counter reading is a natural number between zero and the number of blocks in the at least one memory device.

10. The write protection method as claimed in claim 4, characterized in that the current counter reading minus one (−1) corresponds to the number of the last block written to in the at least one memory device.

11. The write protection method as claimed in claim 1, characterized in that the write protection device is a physical unit which comprises a processing device, which comprises counter device, and a memory.

12. The write protection method as claimed in claim 11, characterized in that the memory has a nonvolatile memory for the current counter reading.

13. The write protection method as claimed in claim 1, characterized in that said command is transferred from a host computer to the at least one memory device, and the write protection device being arranged in a data transfer path between the host computer and the at least one memory device.

14. The write protection method as claimed in claim 13, characterized in that said command is transferred from the host computer to the write protection device as Ethernet data packets, the command for the at least one memory device being generated in the write protection device.

15. The write protection method as claimed in claim 14, characterized in that the positive list for permitted commands is checked after the transferred command is translated and, in said first situation an appropriate command is generated in the write protection device for forwarding to the at least one memory device.

16. The write protection method as claimed in claim 14, characterized in that a command set of the commands which are produced by the host computer and which are transferred as Ethernet data packets is different than a standard command set for the at least one memory device.

17. The write protection method as claimed in claim 1, characterized in that the write protection device is an intermediate plug between a cable connection from the host computer and the at least one memory device.

18. The write protection method as claimed in claim 17, characterized in that the at least one memory device comprises at least one hard disk having various registers, wherein the write command has a number of successive write instructions into the various registers of the at least one hard disk, wherein the write instructions are stored in storage areas of a memory in the write protection device before the write command is forwarded to the at least one hard disk, said storage areas corresponding to the registers of the at least one hard disk, and wherein only after an admissibility check on the write command said write command is forwarded to the at least one memory device.

19. The write protection method as claimed in claim 18, characterized in that the admissibility check on the write command involves comparison with the positive list and/or comparison with a current counter reading.

20. A write protection method for at least one random access memory device, characterized in that a write protection device connected upstream of the at least one memory device receives at least one command sent to the at least one memory device before said at least one command is forwarded to the at least one memory device, wherein the at least one memory device has multiple continuously numbered blocks, wherein said command is a write command which has a first number for a starting block for the write command and a second number of blocks which shall be written to, wherein the write protection device has a counter device whose current counter reading minus one (−1) represents a write-protected area of the at least one memory device, wherein the current counter reading is compared with the first number of the starting block, wherein when the current counter reading is higher than the first number of the starting block, said command is not forwarded to the at least one memory device, with the current counter reading remaining unchanged.

21. A write protection device for carrying out the method as claimed in claim 1.

22. A write protection method for at least one random access memory device, characterized in that a write protection device connected upstream of the at least one memory device receives commands sent to the at least one memory device before said commands are forwarded to the at least one memory device, wherein the at least one memory device has a multiplicity of continuously numbered blocks, wherein said command is the write command which has a first number for a starting block for the write command and a second number of blocks to be written to, wherein the write protection device has a counter device whose current counter reading minus one (−1) represents a write-protected area of the at least one memory device, wherein the current counter reading is compared with the first number of the starting block, and wherein if the current counter reading is higher than the first number of the starting block, said command is not forwarded to the at least one memory device, with the current counter reading remaining unchanged.

* * * * *